April 17, 1934.  G. BOLLA  1,954,982
VALVE GEAR FOR STEAM ENGINES
Filed June 20, 1931    2 Sheets-Sheet 1
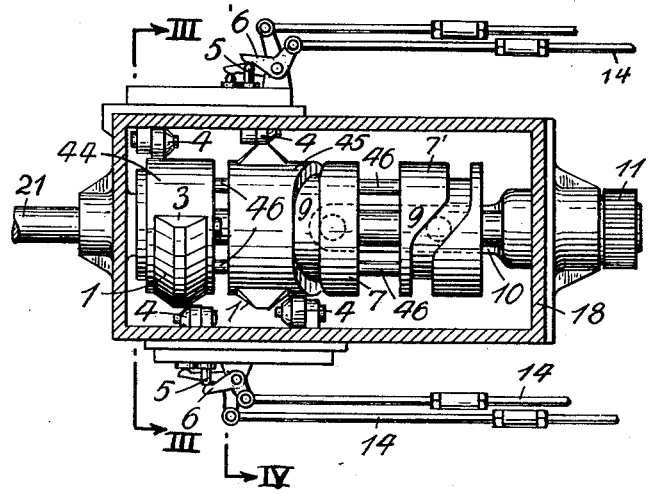
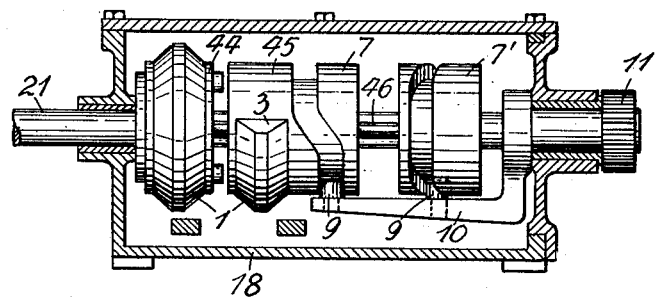
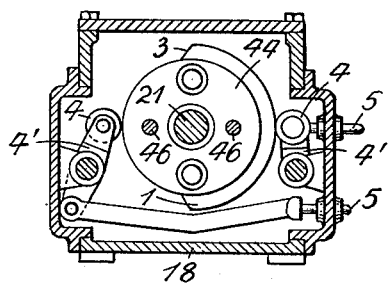 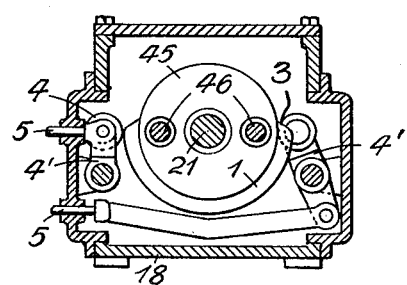
Inventor:
Giovanni Bolla.

April 17, 1934.    G. BOLLA    1,954,982
VALVE GEAR FOR STEAM ENGINES
Filed June 20, 1931    2 Sheets-Sheet 2
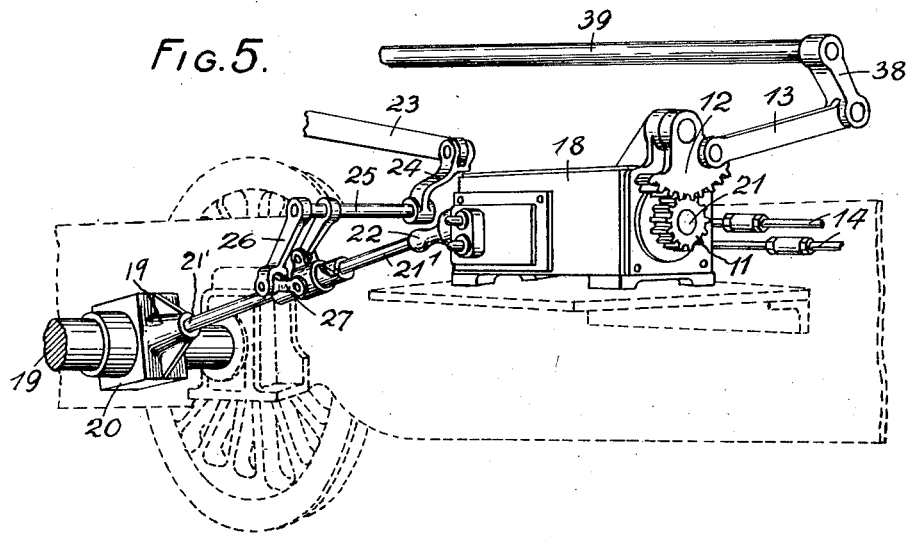
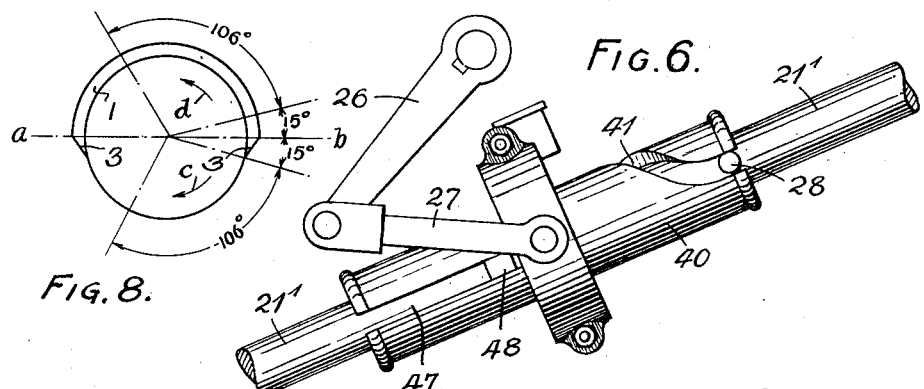
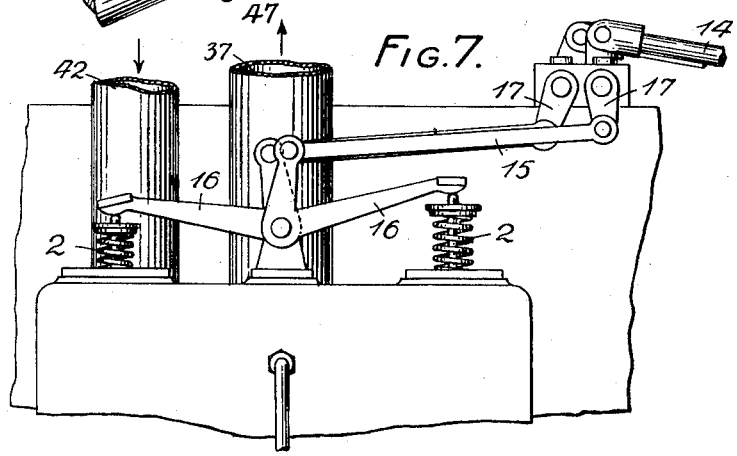
Inventor:
G. Bolla Patented Apr. 17, 1934

1,954,982

UNITED STATES PATENT OFFICE 1,954,982

VALVE GEAR FOR STEAM ENGINES

Giovanni Bolla, Trecate, Italy

Application June 20, 1931, Serial No. 545,786

3 Claims. (Cl. 121—127)

This invention relates to a valve gear for steam locomotive engines and the like of the kind employing rollers and revolving cams which latter are adjustable in axial direction relative to the rollers for varying the phases, and the invention consists in the provision of means for continuously reciprocating the cams axially relative to the rollers and means for timing the reciprocations relative to the driving elements so as to vary the phases according to requirements.

The shaft whereby the cams are rotated is divided into two sections, and means are provided for displacing the two sections through 180° for reversing the engine.

Fig. 1 of the accompanying drawings represents a sectional plan view of the cam mechanism, Fig. 2 is a sectional side view of the same, Fig. 3 is a cross-section on the line III—III of Fig. 1, Fig. 4 is a cross-section on the line IV—IV of Fig. 1, Fig. 5 is a perspective view showing the connection of the valve gear to the locomotive, Fig. 6 is a view on an enlarged scale of the device for reversing the motion, Fig. 7 is a view showing the connection of the gear to the valve operating cranks and Fig. 8 is a diagram illustrating the cam action.

The steam admission to the different cylinders of the locomotive is controlled by means of a cam shaft 21 the cams of which are enclosed in a casing 18 mounted midway between the longitudinal carriers of the locomotive. The cams consist of cylindrical bodies 44 and 45 each of which is fitted with a chamfered rib 1 extending through half the circumference of the supporting body. In the case of two cylinders there are two cams and each co-operates with two rollers 4. The rollers are mounted on levers 4¹ whereby they control plungers 5, and the latter act by means of bell cranks 6, rods 14 and 15, lever arms 17 and bell cranks 16 on admission valves 2 situated at the ends of the cylinders (Fig. 7). The steam is admitted through a pipe 42 which communicates with a steam distributing chamber arranged above each cylinder.

One of the axles 19 of the locomotive transmits motion to the cam shaft 21 through the medium of conical gears enclosed in a casing 20 and through a cardan shaft 21¹ which is connected to the shaft 21 by a universal joint 22. The cardan shaft is divided into two sections both of which are slidable relative to a coupling sleeve 40. The latter has a longitudinal slit 47 in which slides a pin 48 connected to the lower section of the shaft and it has a helical slit 41 in which engages a pin 28 connected to the upper shaft section. The sleeve can be reciprocated on the shaft sections by means of links 27 and levers 26 which are operated from the driver's cab through the medium of a rod 23, a crank 24 and a rock shaft 35. On the sleeve being moved from one end position to the other, the shaft 21 will be turned relative to the driving elements through 180°, and a reversal of the motion of the engine will then take place.

The ends 3 of the cam ribs 1 slope towards the cylindrical supporting body and produce the lead of admission. The steam admission may be cut off at any point of the stroke of the piston. For this purpose the cams are slidable relative to the shaft and controlled by additional cams 7, 7¹ whereby they can be axially displaced for throwing the cam ribs 1 out of register with the rollers 4. The cams 7 may be integral with the adjacent cam body 45, and the cam 7¹ may be connected to the cam body 44 by means of rods 46 passing through holes in the cam structure 7, 45. The rollers are bevelled at one end in conformity with a chamfer of the cam ribs, and the lateral slipping off of the rollers will therefore be effected without shocks. The cams 7, 7¹ are controlled by rollers 9 which engage in grooves in the cams and which are carried by an arm 10. The latter is rotatable about the shaft 21 and mounted on a boss which carries, outside the casing 18, a pinion 11 which meshes with a toothed sector 12. A rock shaft 39, which is operable from the driver's cab, carries an arm 38 which is connected by means of a link 13 to the sector 12 for turning the arm 10. While the cams 1 rotate together with the shaft 21 they are axially reciprocated by the cams 7, 7¹.

The rollers 4 of each cam are arranged at opposite sides of the latter, both on the diametral line $a$—$b$ in Fig. 8. The sloping ends 3 of the cam ribs extend 15° beyond the diametral line and thus produce the lead of admission, one during forward and the other during reverse motion. The rollers are relatively staggered in axial direction, and the cam ribs 1 are reciprocated by the cams 7, 7′ so that each roller will be operated by the leading end of the rib for opening the respective admission valve. Thus the lead of admission will always be constant. Each axial displacement of a cam rib for bringing its leading end into alignment with one of the rollers, causes the other roller to slip off the rib and to cut off the admission. The point of the piston stroke at which the displacement of the cam rib and the cutting off of the admission take place is varied by an adjustment of the arm 10 within an angle of about 106° (Fig. 8) outside the neutral angle of 15° within which the slope 3 operates for opening the valve. The arm 10 is made to move below the diametral line $a$—$b$ when the cam rotates in the direction of the arrow $c$, and above the line when the rotation is in the direction of the arrow $d$.

I claim:

1. A valve gear for steam locomotive engines, comprising admission cams capable of rotary and axially reciprocating motion, connection between the cams and one of the axles of the locomotive for rotating the cams, means for continuously reciprocating the cams, bevelled valve controlling rollers arranged in position to be engaged by said cams for opening the valves and adapted to slip off the cams laterally on the cams being reciprocated for cutting off the steam admission, and means for causing the reciprocations to take place in different angular positions of the cams.

2. A structure as claimed in claim 1 wherein the means for reciprocating the cams and timing the reciprocations comprises auxiliary cams rotating with and connected to the valve operating cams, an arm capable of angular adjustment about said auxiliary cams, rollers on said arm engaging said auxiliary cams for reciprocating them, and means for adjusting the arm about the cams for timing the reciprocations.

3. A valve gear for steam locomotive engines, comprising admission valves capable of rotary and axial reciprocating motion, each cam comprising a cylindrical body having a chamfered rib extending through half the circumference of the body, connection between the cams and the axles of the locomotive for rotating the cams, a pair of bevelled valve controlling rollers arranged at opposite sides of each cam and relatively staggered in the axial direction of the latter, means for reciprocating the cams to bring each cam rib into alignment with each of its rollers in turn, and means for causing the reciprocation to take place in different angular positions of the cams.

GIOVANNI BOLLA.